United States Patent
Xu

(10) Patent No.: US 10,966,079 B2
(45) Date of Patent: Mar. 30, 2021

(54) DEVICE-TO-DEVICE COMMUNICATION METHOD, RESOURCE ASSIGNMENT METHOD, AND APPARATUSES THEREOF

(71) Applicant: Beijing Zhigu Tech Co., Ltd., Beijing (CN)

(72) Inventor: Shaoyi Xu, Beijing (CN)

(73) Assignee: BEIJING ZHIGU TECH CO., LTD., Beijing (CN)

( * ) Notice: Subject to any disclaimer, the term of this patent is extended or adjusted under 35 U.S.C. 154(b) by 450 days.

(21) Appl. No.: 15/337,168

(22) Filed: Oct. 28, 2016

(65) Prior Publication Data

US 2017/0156137 A1 Jun. 1, 2017

(30) Foreign Application Priority Data

Nov. 30, 2015 (CN) .......................... 201510853986.1

(51) Int. Cl.
*H04W 72/04* (2009.01)
*H04W 8/00* (2009.01)
(Continued)

(52) U.S. Cl.
CPC ........... *H04W 8/005* (2013.01); *H04L 5/0032* (2013.01); *H04L 5/0094* (2013.01);
(Continued)

(58) Field of Classification Search
CPC .... H04W 72/048; H04W 72/02; H04W 8/005
See application file for complete search history.

(56) References Cited

U.S. PATENT DOCUMENTS

2014/0112263 A1* 4/2014 Lee ................ H04L 5/1469
370/329
2015/0215903 A1* 7/2015 Zhao ................ H04W 72/04
370/329
(Continued)

FOREIGN PATENT DOCUMENTS

CN 104144501 A 11/2014
CN 104540236 A 4/2015
(Continued)

*Primary Examiner* — Charles C Jiang
*Assistant Examiner* — Voster Preval
(74) *Attorney, Agent, or Firm* — Sheppard Mullin Richter & Hampton LLP

(57) ABSTRACT

Embodiments of the present application disclose a device-to-device (D2D) communication method, a resource assignment method, and apparatuses thereof. The D2D communication method comprises: determining a use state of a first resource, where the first resource is used to perform D2D communication; and sending first information correlated to the use state by using at least one first resource unit (RU) in the first resource, wherein the at least one first RU is an RU at at least one first preset position in the first resource. For the methods and apparatuses in the embodiments of the present application, transmission of a resource at a specific position is used to indicate a use state of a D2D resource, so that at the same time when the basis for achieving relatively high resource use efficiency is provided, particularly the basis for resource adjustment is provided in the absence of cellular network coverage.

28 Claims, 8 Drawing Sheets

S220 — Determine a use state of a first resource

S240 — Send first information correlated to the use state by using at least one first resource unit in the first resource

(51) Int. Cl.
*H04W 72/02* (2009.01)
*H04W 72/08* (2009.01)
*H04L 5/00* (2006.01)
*H04W 56/00* (2009.01)
*H04W 48/10* (2009.01)

(52) U.S. Cl.
CPC ......... *H04W 72/082* (2013.01); *H04L 5/0039* (2013.01); *H04W 48/10* (2013.01); *H04W 56/001* (2013.01)

(56) References Cited

U.S. PATENT DOCUMENTS

| | | | | |
|---|---|---|---|---|
| 2016/0338103 | A1* | 11/2016 | Martin | H04W 74/08 |
| 2017/0142741 | A1* | 5/2017 | Kaur | H04W 56/002 |
| 2017/0150480 | A1* | 5/2017 | Kim | H04W 8/005 |
| 2017/0295553 | A1* | 10/2017 | Lee | H04W 56/001 |
| 2019/0141687 | A1* | 5/2019 | Zhang | H04W 72/0413 |

FOREIGN PATENT DOCUMENTS

| | | | |
|---|---|---|---|
| CN | 104640057 | A | 5/2015 |
| CN | 104869526 | A | 8/2015 |
| WO | 2015062528 | A1 | 5/2015 |

* cited by examiner

DEVICE-TO-DEVICE COMMUNICATION METHOD, RESOURCE ASSIGNMENT METHOD, AND APPARATUSES THEREOF

CROSS REFERENCE TO RELATED APPLICATION

The present application is based on and claims the benefit of priority to Chinese Application No. 201510853986.1, filed on Nov. 30, 2015, the entire contents of which are incorporated herein by reference.

TECHNICAL FIELD

The present application relates to the technical field of device-to-device (D2D) communication, and more particularly to a D2D communication method, a resource assignment method, and apparatuses thereof.

BACKGROUND

As a critical candidate technology for 5G, D2D communication has potential prospects of improving system performance, improving user experience, and extending cellular communications applications and has received wide attention. D2D communication based on a cellular network (or referred to as proximity service (ProSe)) means that user data can be directly transmitted between user equipment (UE) without being relayed by a network.

As shown in FIG. 1, for D2D scenarios, according to whether a base station completely controls D2D devices, partially controls D2D devices or completely controls no D2D device at all, application scenarios may be classified into three categories, that is: a scenario (shown by a solid-line ellipse) in which a base station (eNB) completely covers D2D devices, a scenario in which a base station partially controls a D2D device, and a scenario (shown by a dotted-line ellipse) in which a base station does not control a D2D device at all, as shown in FIG. 1. Because there are these three different coverage cases and different device deployment cases (dense deployment, normal deployment, and sparse deployment), how to assign resources to D2D devices is a great challenge for D2D communication. In particular, for a scenario of completely no coverage of a base station, at the same time when backward compatibility needs to be supported, it needs to be ensured as much as possible that system complexity does not increase, and the adaptability to dynamically changing environment needs to be as high as possible, for example, how to determine a period of device discovery, how to find a usable resource to perform device discovery, and how to adjust these parameters to adapt to different scenarios of device discovery in the absence of assistance from a base station are problems that are to be considered and resolved.

SUMMARY

In view of this, an objective of the embodiments of the present application is to provide a D2D communication and resource assignment solution suitable for various cases of coverage of a base station.

To implement the foregoing objective, according to a first aspect of an embodiment of the present application, a D2D communication method is provided, wherein the method comprises:

determining a use state of a first resource, where the first resource is used to perform D2D communication; and sending first information correlated to the use state by using at least one first resource unit (RU) in the first resource, wherein the at least one first RU is an RU at at least one first preset position in the first resource.

According to a second aspect of an embodiment of the present application, a D2D communication method is provided, wherein the method comprises:

determining a use state of a first resource, where the first resource is used to perform D2D communication; and adjusting the first resource at least based on the use state of the first resource, wherein a first RU is an RU at at least one first preset position in the first resource.

According to a third aspect of the present application, a method for assigning a D2D communication resource is provided, wherein the method comprises:

assigning a first resource used to perform D2D communication; and sending resource configuration information correlated to the assignment, wherein the first resource comprises at least one first RU, and the at least one first RU is an RU at at least one first preset position in the first resource, and is used to transmit first information correlated to a use state of the first resource.

According to a fourth aspect of the present application, a D2D communication apparatus is provided, wherein the apparatus comprises:

a first determining module, configured to determine a use state of a first resource, where the first resource is used to perform D2D communication; and a first sending module, configured to send first information correlated to the use state by using at least one first RU in the first resource, wherein the at least one first RU is an RU at at least one first preset position in the first resource.

According to a fifth aspect of the present application, a D2D communication apparatus is provided, wherein the apparatus comprises:

a third determining module, configured to determine a use state of a first resource, where the first resource is used to perform D2D communication; and a second adjustment module, configured to adjust the first resource at least based on the use state of the first resource, wherein a first RU is an RU at at least one first preset position in the first resource.

According to a sixth aspect of the present application, an apparatus for assigning a D2D communication resource is provided, wherein the apparatus comprises:

an assignment module, configured to assign a first resource used to perform D2D communication; and a third sending module, configured to send resource configuration information correlated to the assignment, wherein the first resource comprises at least one first RU, and the at least one first RU is an RU at at least one first preset position in the first resource, and is used to transmit first information correlated to a use state of the first resource.

According to a seventh aspect of the present application, a D2D communication apparatus is provided, wherein the apparatus comprises:

a transceiver;

a memory, configured to store an instruction; and a processor, configured to execute the instruction stored in the memory, where the instruction causes the processor to execute the following steps:

determining a use state of a first resource, where the first resource is used to perform D2D communication; and sending, by using the transceiver, first information correlated to the use state by using at least one first RU in the first resource, wherein the at least one first RU is an RU at at least one first preset position in the first resource.

According to an eighth aspect of the present application, a D2D communication apparatus is provided, wherein the apparatus comprises:

a transceiver;

a memory, configured to store an instruction; and a processor, configured to execute the instruction stored in the memory, where the instruction causes the processor to execute the following steps:

determining a use state of a first resource, where the first resource is used to perform D2D communication; and adjusting the first resource at least based on the use state of the first resource, wherein a first RU is an RU at at least one first preset position in the first resource.

According to a ninth aspect of the present application, an apparatus for assigning a D2D communication resource is provided, wherein the apparatus comprises:

a transceiver;

a memory, configured to store an instruction; and a processor, configured to execute the instruction stored in the memory, where the instruction causes the processor to execute the following steps:

assigning a first resource used to perform D2D communication; and sending, by using the transceiver, resource configuration information correlated to the assignment, wherein the first resource comprises at least one first RU, and the at least one first RU is an RU at at least one first preset position in the first resource, and is used to transmit first information correlated to a use state of the first resource.

For the methods and apparatuses in the embodiments of the present application, transmission of a resource at a specific position is used to indicate a use state of a D2D resource, so that at the same time when the basis for achieving relatively high resource use efficiency is provided, particularly the basis for resource adjustment is provided in the absence of cellular network coverage.

DETAILED DESCRIPTION

The specific implementing manners of the present invention are further described below in detail with reference to the accompanying drawings and embodiments. The embodiments below are used for describing the present invention rather than to limit the scope of the present invention.

Persons skilled in the art may understand that the terms such as "first" and "second" in the present application are merely used to distinguish different devices, modules or parameters, and neither represent any specific technical meanings, nor represent a necessary logical order among the different devices, modules or parameters.

In the embodiments of the present application, the term "D2D device" is any device having a D2D communication capability, and comprises but not limited to: a telephone (for example, a cellphone or a smartphone), a computer (for example, a notebook computer), a portable communications device, a portable computing device (for example, a personal digital assistant), an entertainment device (for example, a music or video device, or a satellite radio device), a vehicle-mounted smart device, a wearable device or any another suitable device configured with a D2D communication capability. The term "base station" may comprise, be implemented as, or be referred to as a node B, an evolved node B (eNode B), a radio network controller (RNC), a base station controller (BSC), a base transceiver station (BTS), a base station (BS), a transceiver function (TF), a wireless router, a radio transceiver, a basic service set (BSS), an extended service set (ESS), a radio base station (RBS), or another term. The term "first resource" is a D2D communication resource initially assigned by a base station, and may be used in a D2D discovery period (DP) and is referred to as a D2D discovery resource, or may be used in a D2D communication period and is referred to as D2D data resource. In the technical solutions in the embodiments of the present application, in a scenario in which a base station fails to provide coverage, a D2D device may adjust the first resource according to a rule provided in the embodiments of the present application. The term "resource unit (RU)" is a minimum RU that may be arbitrarily set according to a need and is used in a D2D communication process (for example, a D2D DP) of a D2D device. An RU may be a physical resource block (PRB) (according to the definition by 3GPP), or an RU smaller than a resource block (RB) (according to the definition by Qualcomm). The term "resource group (RG)" is an RU formed of a first preset quantity of continuous RUs. In the embodiments of the present application, an RG may be used as a unit in adjustment of a first resource. For example, one RG is added/deleted.

Figure 1:
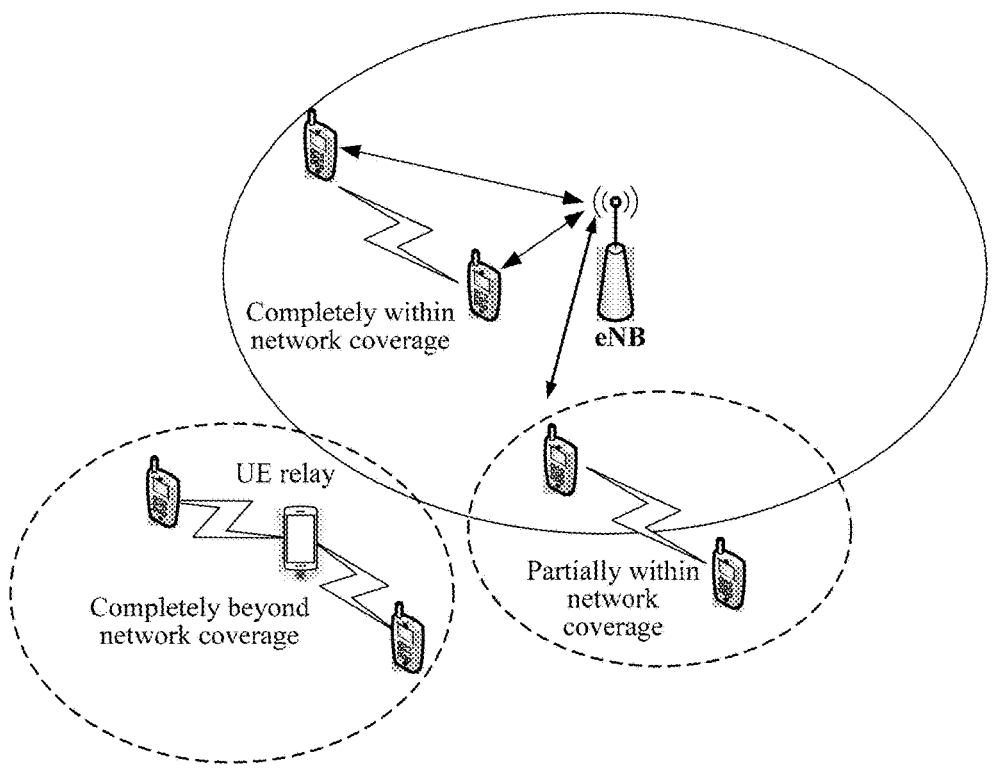
FIG. 1 is a schematic diagram of a D2D communication scenario in three different coverage cases.
Figure 2A:
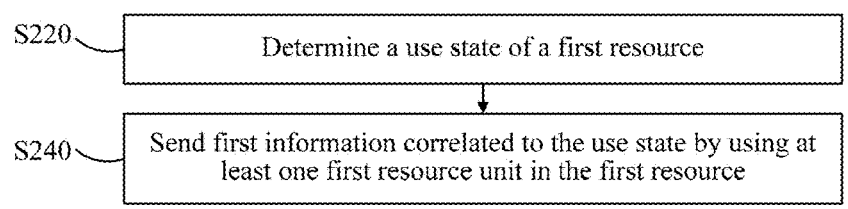
FIG. 2(a) is a flowchart of an example of a D2D communication method according to a first embodiment of the present application.

FIG. 2(a) is a flowchart of an example of a D2D communication method according to a first embodiment of the present application. The method may be executed by an apparatus that belongs to a D2D device or executed by a D2D device. As shown in FIG. 2(a), the method comprises:

S220: Determine a use state of a first resource, where the first resource is used to perform D2D communication.

S240: Send first information correlated to the use state by using at least one first RU in the first resource.

Figure 2B:
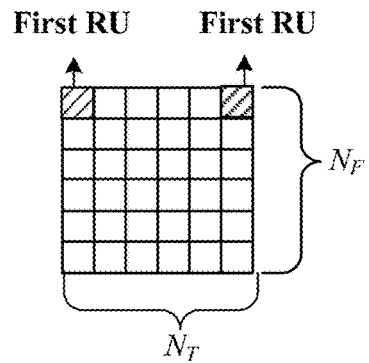
FIG. 2(b) is a schematic structural diagram of a resource group (RG) in a D2D communication method according to an embodiment of the present application.

The at least one first RU is an RU at one or more first preset positions in the first resource. The first preset position may be any fixed position in the first resource. In a possible implementing manner, the first preset position may be a second preset position in an RG of one or more positions. FIG. 2(b) shows an RG in an example, where each box represents one RU, the RG comprises $N_T \times N_F$ RUs, and the at least one first RU may be a first RU in an RG (in time domain), as shown by a diagonal fill in the upper left corner in FIG. 2(b), or may be one last RU (in time domain), as shown by a diagonal fill in the upper right corner in FIG. 2(b). The first preset position may further be a position relative to a special signal in D2D communication. In a possible implementing manner, the special signal may be a D2D synchronization signal (D2DSS), and the first preset position is a position that has a particular offset relative to a D2DSS. In the method in this embodiment, a position of the at least one first RU is known to D2D devices, a D2D device may acquire, by using a manner of performing monitoring on a resource at the position, the use state of the first resource reported by another D2D device, and/or after the use state of the first resource is actively detected by using another possible manner, in Step S240, information used to indicate the use state of the first resource is transmitted by using the at least one first RU.

In addition, in the method in this embodiment, the use state of the first resource comprises but not limited to: the resource is redundant, the resource is insufficient, and the like. In a possible implementing manner, the use state of the at least one first RU may be transmitted by using a manner of transmitting, on the at least one first RU, information modulated with a use state. In another possible implementing manner, first RUs at different positions may be used to indicate different use states. For example, in each RG shown in FIG. 2(b), information transmitted on a first RU in an upper left corner may indicate that the first resource is surplus, and information transmitted on a first RU in an upper right corner may indicate that the first resource is insufficient.

In the method in this embodiment, transmission of a resource at a specific position is used to indicate a use state of a D2D resource, so that at the same time when the basis for achieving relatively high resource use efficiency is provided, particularly the basis for resource adjustment is provided in the absence of cellular network coverage.

As discussed above, the method in this embodiment may make first RUs at different positions correspond to different use states, and to determine a use state of a first resource more accurately, the apparatus for executing the method in this embodiment may determine a use state of a first resource only when a sufficiently large quantity of signals are detected on a corresponding first RU. In other words, only a use state reported by a sufficiently large quantity of D2D devices is regarded as an actual use state. For example, signals from D2D devices whose quantity exceeds a specific quantity are detected on the first RU in the upper right corner in the RG shown in FIG. 2(b), and it may be determined that a use state of a first resource is that the resource is insufficient. In such a case, Step S220 may comprise:

S221: Determine the use state of the first resource at least based on a quantity of D2D devices corresponding to a signal received on the at least one first RU.

In another possible implementing manner, the use state of the first resource may be further determined at least based on energy of a signal received on the at least one first RU. Specifically, for example, in the RG shown in FIG. 2(b), if energy of a signal detected on the first RU in the upper right corner exceeds a preset energy threshold, it represents that the use state of the first resource is insufficient; if the energy of the signal detected on the first RU in the upper left corner exceeds the threshold, it represents that the use state of the first resource is redundant; and if the energy of the signal received on the first RU does not exceed the threshold, it represents that the use state of the first resource is normal. In such a case, Step S220 may comprise:

S222: Determine the use state of the first resource at least based on energy of a signal received on the at least one first RU.

In still another possible implementing manner, only one or more specific D2D devices may detect and report (for example, broadcast) the use state of the first resource by using the first RU, so that the use state of the first resource is used by another D2D device as a reference for using/adjusting the first resource. In the method in this embodiment, the use state may be determined by using a manner of monitoring and acquiring a use state reported by such one or more D2D devices. In such a case, Step S220 may comprise:

S223: In response to that a signal received on the at least one first RU is from at least one preset D2D device, determine the use state of the first resource at least based on the received signal. In such a case, the determining the use state of the first resource according to the received signal comprises determining the use state of the first resource based on a position of a first RU corresponding to a received signal and/or energy of a received signal as described above.

In still another possible implementing manner, in the method in this embodiment, the first resource comprises at least two RGs, and at least one RG of the at least two RGs is used to send a D2DSS when necessary. Such an RG is referred to as a first RG hereinafter, and an RU at a second preset position on the first RG may also be the first RU. Generally, a D2DSS is sent by a base station, and in the partial or complete absence of the coverage of a base station, a D2DSS may be sent by a specific D2D device (for example, a cluster head device). In the method in this embodiment, after a cluster head terminates sending of a D2DSS, another D2D device may continue to send a D2DSS. In such an implementing manner, except that a D2DSS and/or information used to indicate the use state of the first resource is sent when necessary, the first RG is used as a backup RG, and nearly does not carry any another information. When a D2D device cannot find, on a conventional RG, a resource used to send a discovery signal or D2D data, the resource may be sent by using an RU on the first RG. That is, when a signal is detected on the first RG, it may mean that the use state of the first resource is that the resource is insufficient. In such a case, Step S220 may comprise:

S224: Determine the use state of the first resource at least based on a signal received on at least one RU in the RG used to send a D2DSS.

Figure 2C:
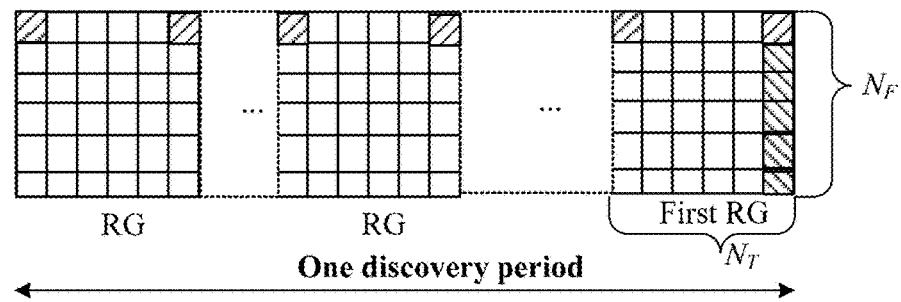
FIG. 2(c) is a schematic diagram of a first resource in an example.

FIG. 2(c) is a schematic diagram of a first resource in an example. In the example in FIG. 2(c), the first resource is a discovery resource, and FIG. 2(c) shows a first resource of a DP. The first resource comprises several continuous or intermittent RGs, and in each DP, each D2D device selects one RU to send a discovery signal, and such an act can occur only once. That is, each D2D device can perform only once an act of sending a discovery signal in one DP, and is monitoring a discovery signal sent by another device during the rest time. For discontinuous RGs, resources between two RGs may be used for D2D communication or communication of a cellular network (for example, Long Term Evolution-Advanced (LTE-A)) system. In FIG. 2(c), one last RG in the DP is a first RG, and nearly does not carry a signal or is not used to send a D2DSS on an RU having a slash fill in FIG. 2(c).

In still another possible implementing manner, the apparatus for executing the method in this embodiment may determine the use state of the first resource by using a manner of actively searching for a usable resource. Generally, the search may start from the first RU of the first RG, until one last RU of one last RG is detected. In the method in this embodiment, one D2D device is allowed to detect multiple usable RUs, and one or more usable RUs are randomly selected. In such a case, Step S220 may comprise:

S225: Determine the use state of the first resource in response to that a second preset quantity of continuous RUs have the same occupying state. For example, when a second preset quantity of continuous RUs are not occupied, it may be determined that the use state of the first resource is that the resource is redundant.

Alternatively, Step S220 may comprise:

S226: Determine the use state of the first resource in response to that a third preset quantity of RUs have the same occupying state. For example, when it is detected that a third preset quantity of RUs are not occupied, it may be determined that the use state of the first resource is that the resource is redundant.

The second preset quantity and the third preset quantity may be arbitrarily set according to factors such as a deployment density of D2D devices and a size of a first resource. For example, a quantity of RUs comprised in one RG is the first preset quantity.

As discussed above, the apparatus for executing the method in this embodiment may send first information correlated to the use state by using only at least one first RU in the first RG, that is, Step S240 may further comprise:

S242: Send the first information correlated to the use state by using the at least one first RU in the first RG.

In addition, as discussed above, the method in this embodiment is particularly applicable to a D2D communication scenario of completely no coverage of a base station, in the absence of the assistance from a base station, and in the method in this embodiment, the first resource may be dynamically adjusted based on the use state of the first resource. In such a case, the method in this embodiment further comprises:

S260: Adjust the first resource at least based on the use state of the first resource.

Specifically, after the apparatus for executing the method in this embodiment cannot receive a D2DSS from a base station or a D2DSS from another device, the apparatus sends a D2DSS, and implements dynamic adjustment of the first resource based on the use state of the first resource. In such a case, Step S260 may further comprise:

S262: In response to that a D2DSS cannot be received, adjust the first resource at least based on the use state of the first resource.

As discussed above, in a possible implementing manner, an RG may be used as a unit to adjust the first resource. For example, when the use state shows that the first resource is insufficient, one RG is added to the first resource; and when the use state shows that the first resource is redundant, one RG is reduced from the first resource.

Figure 2D:
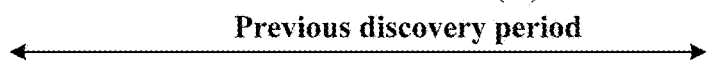
FIG. 2(d) to FIG. 2(e) are schematic diagrams of the first resource in FIG. 2(c) after adjustment in an example.
Figure 2D:
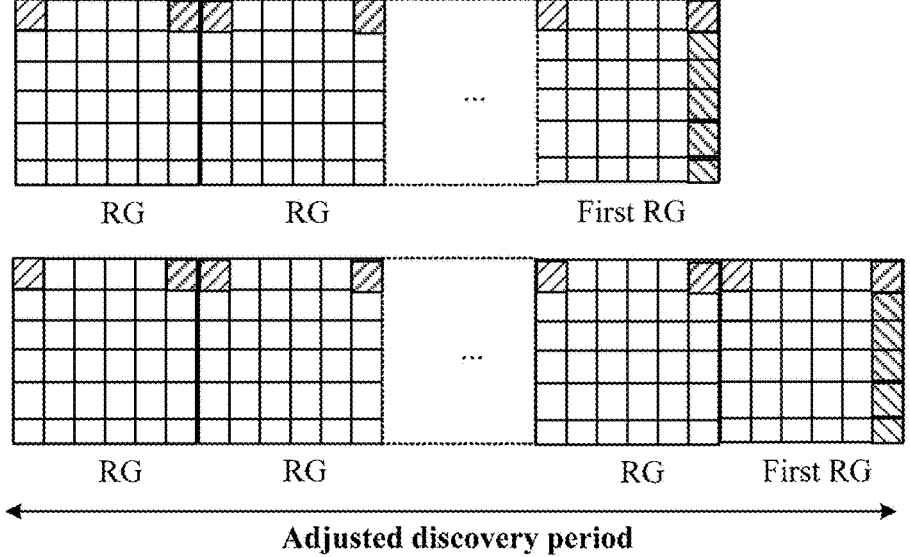
Figure 2E:
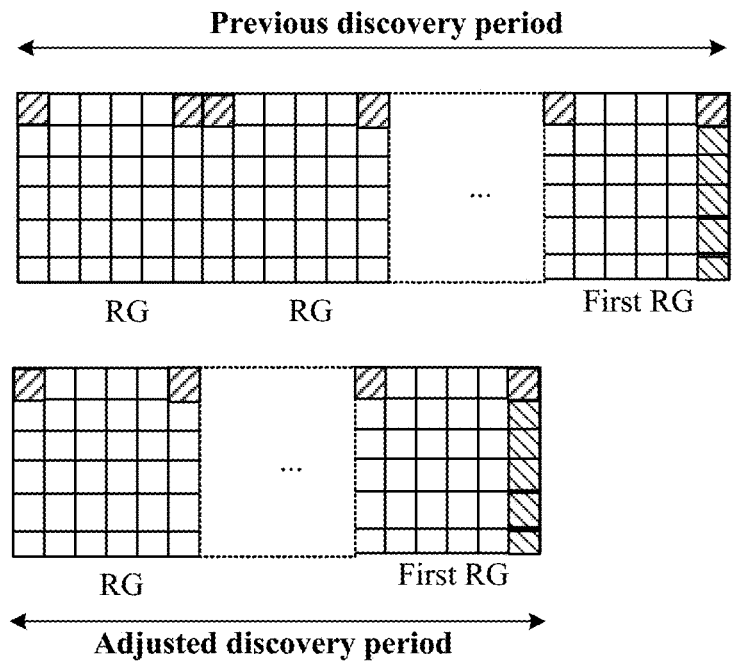

The discovery resource shown in FIG. 2(c) is used as an example. According to the method in this embodiment, when the first resource is insufficient, one RG may be added, and the first RG is still one last RG in one DP, as shown in FIG. 2(d). When the first resource is redundant, one RG may be deleted, and the first RG is still one last RG in one DP, as shown in FIG. 2(e). Therefore, the first resource is adjusted, and the DP is adjusted.

In a possible implementing manner, the first RG discussed above may be used to send a D2DSS.

In response to that a D2DSS cannot be received, an RU in the first RG is used to send a D2DSS.

In the method in this embodiment, after the first resource is adjusted, the first RG may be used to send second information correlated to the adjusted first resource, to notify another D2D device of the changed first resource. Specifically, the method in this embodiment further comprises:

S280: Send second information correlated to the adjusted first unit by using at least one RU in the first RG.

In the method in this embodiment, the first resource is initially assigned by a base station, information related to the assignment may be acquired by using a manner of directly communicating with a base station or indirectly communicating with a base station by using another D2D device. In such a case, the method in this embodiment further comprises:

S112: Acquire resource configuration information.

S114: Determine the first resource at least based on the resource configuration information.

It should be noted that, the method in this embodiment is applicable to a scenario of completely no coverage of a cellular network, but is still applicable to scenarios of partial coverage of a cellular network and complete coverage of a cellular network. In such cases, the first RG may be not used to send a D2DSS, and is used as only a backup RG.

In conclusion, the method in this embodiment is applicable to scenarios of no coverage of a base station, partial coverage of a base station, and full coverage of a base station, regardless of dense deployment of devices, medium-density deployment or sparse deployment. Even, without the help of a base station, a D2D device can also find a usable resource to implement functions of device discovery and/or D2D communication. For a scenario of dense deployment, the method in this embodiment can still work desirably without causing severe interference and resource conflict. For sparse deployment, the method in this embodiment can increase spectral efficiency and discovery efficiency. It should be particularly noted that, the method in this embodiment can use the same method and physical channel to adapt to the two scenarios of deployment, and additional system complexity is not increased for different scenarios.

Figure 3:
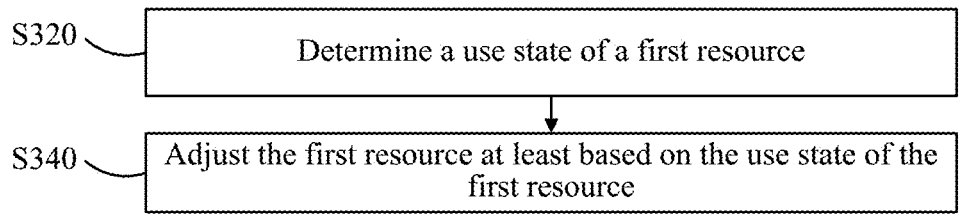
FIG. 3 is a flowchart of an example of a D2D communication method according to a second embodiment of the present application.

FIG. 3 is a flowchart of an example of a D2D communication method according to a second embodiment of the present application. The method may be executed by an apparatus that belongs to a D2D device or executed by a D2D device. As shown in FIG. 3, the method comprises:

S320: Determine a use state of a first resource, where the first resource is used to perform D2D communication.

S340: Adjust the first resource at least based on the use state of the first resource.

As described with reference to FIG. 2(a), the method in this embodiment is particularly applicable to a D2D communication scenario of completely no coverage of a base station, in the absence of the assistance from a base station, and in the method in this embodiment, the first resource may be dynamically adjusted based on the use state of the first resource.

A first RU is an RU at one or more first preset positions in the first resource. The first preset position may be any fixed position in the first resource. In a possible implementing manner, the first preset position may be a second preset position in an RG of one or more positions. FIG. 2(b) shows an RG in an example, where each box represents one RU, the RG comprises $N_T \times N_F$ RUs, and the first RU may be a first RU in an RG (in time domain), as shown by a diagonal fill in the upper left corner in FIG. 2(b), or may be one last RU (in time domain), as shown by a diagonal fill in the upper right corner in FIG. 2(b). The first preset position may further be a position relative to a special signal in D2D communication. In a possible implementing manner, the special signal may be a D2DSS, and the first preset position is a position that has a particular offset relative to a D2DSS. In the method in this embodiment, a position of the first RU is known to D2D devices, a D2D device may acquire, by using a manner of performing monitoring on a resource at the position, the use state of the first resource reported by another D2D device, and/or after the use state of the first resource is actively detected by using another possible manner, information used to indicate the use state of the first resource is transmitted by using the first RU.

In addition, in the method in this embodiment, the use state of the first resource comprises but not limited to: the resource is redundant, the resource is insufficient, and the like. In a possible implementing manner, the use state of the first RU may be transmitted by using a manner of transmitting, on the first RU, information modulated with a use state. In another possible implementing manner, first RUs at different positions may be used to indicate different use states. For example, in each RG shown in FIG. 2(b), information transmitted on a first RU in an upper left corner may indicate that the first resource is surplus, and information transmitted on a first RU in an upper right corner may indicate that the first resource is insufficient.

In the method in this embodiment, transmission of a resource at a specific position is used to indicate a use state of a D2D resource, and it can be particularly implemented that the basis for resource adjustment is provided in a case of no coverage of a cellular network.

As discussed above, the method in this embodiment may make first RUs at different positions correspond to different use states, and to determine a use state of a first resource more accurately, the apparatus for executing the method in this embodiment may determine a use state of a first resource only when a sufficiently large quantity of signals are detected on a corresponding first RU. In other words, only a use state reported by a sufficiently large quantity of D2D devices is regarded as an actual use state. For example, signals from D2D devices whose quantity exceeds a specific quantity are detected on the first RU in the upper right corner in the RG shown in FIG. 2(b), and it may be determined that a use state of a first resource is that the resource is insufficient. In such a case, Step S320 may comprise:

S321: Determine the use state of the first resource at least based on a quantity of D2D devices corresponding to a signal received on the at least one first RU.

In another possible implementing manner, the use state of the first resource may be further determined at least based on energy of a signal received on the at least one first RU. Specifically, for example, in the RG shown in FIG. 2(b), if energy of a signal detected on the first RU in the upper right corner exceeds a preset energy threshold, it represents that the use state of the first resource is insufficient; if the energy of the signal detected on the first RU in the upper right corner exceeds the threshold, it represents that the use state of the first resource is redundant; and if the energy of the signal received on the first RU does not exceed the threshold, it represents that the use state of the first resource is normal. In such a case, Step S320 may comprise:

S322: Determine the use state of the first resource at least based on energy of a signal received on the at least one first RU.

In still another possible implementing manner, only one or more specific D2D devices may detect and report (for example, broadcast) the use state of the first resource by using the first RU, so that the use state of the first resource is used by another D2D device as a reference for using/adjusting the first resource. In the method in this embodiment, the use state may be determined by using a manner of monitoring and acquiring a use state reported by such one or more D2D devices. In such a case, Step S320 may comprise:

S323: In response to that a signal received on the at least one first RU is from at least one preset D2D device, determine the use state of the first resource at least based on the received signal. In such a case, the determining the use state of the first resource according to the received signal comprises determining the use state of the first resource based on a position of a first RU corresponding to a received signal and/or energy of a received signal as described above.

In still another possible implementing manner, in the method in this embodiment, the first resource comprises at least two RGs, and at least one RG of the at least two RGs is used to send a D2DSS when necessary. Such an RG is referred to as a first RG hereinafter, and an RU at a second preset position on the first RG may also be the first RU. Generally, a D2DSS is sent by a base station, and in the partial or complete absence of the coverage of a base station, a D2DSS may be sent by a specific D2D device (for example, a cluster head device). In the method in this embodiment, after a cluster head terminates sending of a D2DSS, another D2D device may continue to send a D2DSS. In such an implementing manner, except that a D2DSS and/or information used to indicate the use state of the first resource is sent when necessary, the first RG is used as a backup RG, and nearly does not carry any another information. When a D2D device cannot find, on a conventional RG, a resource used to send a discovery signal or D2D data, the resource may be sent by using an RU on the first RG. That is, when a signal is detected on the first RG, it may mean that the use state of the first resource is that the resource is insufficient. In such a case, Step S320 may comprise:

S324: Determine the use state of the first resource at least based on a signal received on at least one RU in the RG used to send a D2DSS.

FIG. 2(c) is a schematic diagram of a first RG in an example. In the example in FIG. 2(c), the first resource is a discovery resource, and FIG. 2(c) shows a first resource of a DP. The first resource comprises several continuous or intermittent RGs, and in each DP, each D2D device selects one RU to send a discovery signal, and such an act can occur only once. That is, each D2D device can perform only once an act of sending a discovery signal in one DP, and is monitoring a discovery signal sent by another device during the rest time. For discontinuous RGs, resources between two RGs may be used for D2D communication or communication of a cellular network (for example, LTE-A) system. In FIG. 2(c), one last RG in the DP is a first RG, and nearly does not carry a signal or is not used to send a D2DSS on an RU having a slash fill in FIG. 2(c).

In still another possible implementing manner, the apparatus for executing the method in this embodiment may determine the use state of the first resource by using a manner of actively searching for a usable resource. Generally, the search may start from the first RU of the first RG, until one last RU of one last RG is detected. In the method in this embodiment, one D2D device is allowed to detect multiple usable RUs, and one or more usable RUs are randomly selected. In such a case, Step S320 may comprise:

S325: Determine the use state of the first resource in response to that a second preset quantity of continuous RUs have the same occupying state. For example, when a second preset quantity of continuous RUs are not occupied, it may be determined that the use state of the first resource is that the resource is redundant.

Alternatively, Step S320 may comprise:

S326: Determine the use state of the first resource in response to that a third preset quantity of RUs have the same occupying state. For example, when it is detected that a third preset quantity of RUs are not occupied, it may be determined that the use state of the first resource is that the resource is redundant.

The second preset quantity and the third preset quantity may be arbitrarily set according to factors such as a deployment density of D2D devices and a size of a first resource. For example, a quantity of RUs comprised in one RG is the first preset quantity.

As discussed above, in the method in this embodiment, after the use state of the first resource is determined, the use state of the first resource may be further reported (for example, broadcast) by using the first RU, so that the use state of the first resource is used by another D2D device as a reference for using/adjusting the first resource. In such a case, the method in this embodiment further comprises:

S360: Send first information correlated to the use state by using at least one first RU in the first resource.

As discussed above, the apparatus for executing the method in this embodiment may send first information correlated to the use state by using only at least one first RU in the first RG, that is, Step S360 may further comprise:

S362: Send the first information correlated to the use state by using the at least one first RU in the first RG.

In addition, in Step S340, after the apparatus for executing the method in this embodiment cannot receive a D2DSS from a base station or a D2DSS from another device, the apparatus sends a D2DSS, and implements dynamic adjustment of the first resource based on the use state of the first resource. In such a case, Step S340 may further comprise:

S342: In response to that a D2DSS cannot be received, adjust the first resource at least based on the use state of the first resource.

As discussed above, in a possible implementing manner, an RG may be used as a unit to adjust the first resource. For example, when the use state shows that the first resource is insufficient, one RG is added to the first resource; and when the use state shows that the first resource is redundant, one RG is reduced from the first resource.

The discovery resource shown in FIG. 2(c) is used as an example. According to the method in this embodiment, when the first resource is insufficient, one RG may be added, and the first RG is still one last RG in one DP, as shown in FIG. 2(d). When the first resource is redundant, one RG may be deleted, and the first RG is still one last RG in one DP, as shown in FIG. 2(e). Therefore, the first resource is adjusted, and the DP is adjusted.

In a possible implementing manner, the first RG discussed above may be used to send a D2DSS.

In response to that a D2DSS cannot be received, an RU in the first RG is used to send a D2DSS.

In the method in this embodiment, after the first resource is adjusted, the first RG may be used to send second information correlated to the adjusted first resource, to notify another D2D device of the changed first resource. Specifically, the method in this embodiment further comprises:

S380: Send second information correlated to the adjusted first unit by using at least one RU in the first RG.

In the method in this embodiment, the first resource is initially assigned by a base station, information related to the assignment may be acquired by using a manner of directly communicating with a base station or indirectly communicating with a base station by using another D2D device. In such a case, the method in this embodiment further comprises:

S312: Acquire resource configuration information.

S314: Determine the first resource at least based on the resource configuration information.

It should be noted that, the method in this embodiment is applicable to a scenario of completely no coverage of a cellular network, but is still applicable to scenarios of partial coverage of a cellular network and complete coverage of a cellular network. In such cases, the first RG may be not used to send a D2DSS, and is used as only a backup RG.

In conclusion, the method in this embodiment is applicable to scenarios of no coverage of a base station, partial coverage of a base station, and full coverage of a base station, regardless of dense deployment of devices, medium-density deployment or sparse deployment. Even, without the help of a base station, a D2D device can also find a usable resource to implement functions of device discovery and/or D2D communication. For a scenario of dense deployment, the method in this embodiment can still work desirably without causing severe interference and resource conflict. For sparse deployment, the method in this embodiment can increase spectral efficiency and discovery efficiency. It should be particularly noted that, the method in this embodiment can use the same method and physical channel to adapt to the two scenarios of deployment, and additional system complexity is not increased for different scenarios.

Figure 4:
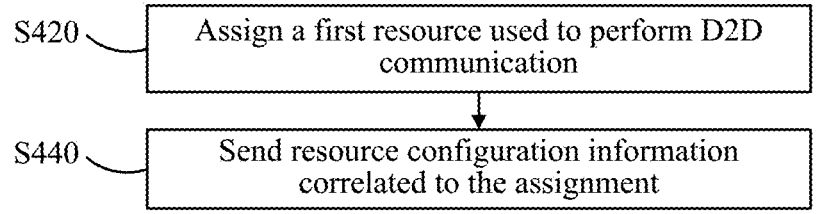
FIG. 4 is a flowchart of an example of a method for assigning a D2D communication resource according to an embodiment of the present application.

As shown in FIG. 4, an embodiment of the present application further provides a method for assigning a D2D communication resource. The method may be executed by a base station. As shown in FIG. 4, the method comprises the steps:

S420: Assign a first resource used to perform D2D communication.

S440: Send resource configuration information correlated to the assignment.

The involved first resource and the like may all be as described with reference to FIG. 2(a) and FIG. 3.

It should be understood by a person skilled in the art that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

In addition, an embodiment of the present application further provides a computer readable medium, comprising a computer readable instruction that performs, when being executed, the following operation: executing operations of steps of the method shown in the implementing manner in the foregoing FIG. 2(a).

In addition, an embodiment of the present application further provides a computer readable medium, comprising a computer readable instruction that performs, when being executed, the following operation: executing operations of steps of the method shown in the implementing manner in the foregoing FIG. 3.

In addition, an embodiment of the present application further provides a computer readable medium, comprising a computer readable instruction that performs, when being executed, the following operation: executing operations of steps of the method shown in the implementing manner in the foregoing FIG. 4.

Figure 5A:
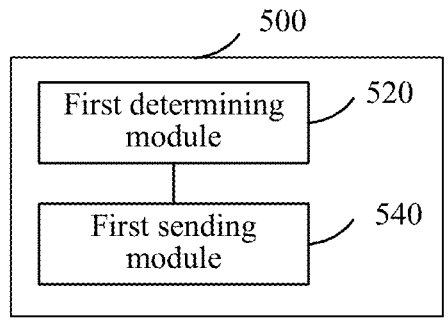
FIG. 5(a) to FIG. 5(c) are structural block diagrams of multiple examples of a D2D communication apparatus according to a first embodiment of the present application.

FIG. 5(a) is a structural block diagram of an example of a D2D communication apparatus according to a first embodiment of the present application. The apparatus may belong to a D2D device or may be a D2D device. As shown in FIG. 5(a), the D2D communication apparatus 500 in this embodiment of the present application comprises:

a first determining module 520, configured to determine a use state of a first resource, where the first resource is used to perform D2D communication; and a first sending module 540, configured to send first information correlated to the use state by using at least one first RU in the first resource.

The at least one first RU is an RU at one or more first preset positions in the first resource. The first preset position may be any fixed position in the first resource. In a possible implementing manner, the first preset position may be a second preset position in an RG of one or more positions. FIG. 2(b) shows an RG in an example, where each box represents one RU, the RG comprises $N_T \times N_F$ RUs, and the at least one first RU may be a first RU in an RG (in time domain), as shown by a diagonal fill in the upper left corner in FIG. 2(b), or may be one last RU (in time domain), as shown by a diagonal fill in the upper right corner in FIG. 2(b). The first preset position may further be a position relative to a special signal in D2D communication. In a possible implementing manner, the special signal may be a D2DSS, and the first preset position is a position that has a particular offset relative to a D2DSS. In the apparatus in this embodiment, a position of the at least one first RU is known to D2D devices, a D2D device may acquire, by using a manner of performing monitoring on a resource at the position, the use state of the first resource reported by another D2D device, and/or after the use state of the first resource is actively detected by using another possible manner, the first sending module 540 transmits, by using the at least one first RU, information used to indicate the use state of the first resource.

In addition, in the apparatus in this embodiment, the use state of the first resource comprises but not limited to: the resource is redundant, the resource is insufficient, and the like. In a possible implementing manner, the use state of the first RU may be transmitted by using a manner of transmitting, on the first RU, information modulated with a use state. In another possible implementing manner, first RUs at different positions may be used to indicate different use states. For example, in each RG shown in FIG. 2(b), information transmitted on a first RU in an upper left corner may indicate that the first resource is surplus, and information transmitted on a first RU in an upper right corner may indicate that the first resource is insufficient.

In the apparatus in this embodiment, transmission of a resource at a specific position is used to indicate a use state of a D2D resource, so that at the same time when the basis for achieving relatively high resource use efficiency is provided, particularly the basis for resource adjustment is provided in the absence of cellular network coverage.

As discussed above, the apparatus in this embodiment may make first RUs at different positions correspond to different use states, and to determine a use state of a first resource more accurately, the apparatus for executing the method in this embodiment may determine a use state of a first resource only when a sufficiently large quantity of signals are detected on a corresponding first RU. In other words, only a use state reported by a sufficiently large quantity of D2D devices is regarded as an actual use state. For example, signals from D2D devices whose quantity exceeds a specific quantity are detected on the first RU in the upper right corner in the RG shown in FIG. 2(b), and it may be determined that a use state of a first resource is that the resource is insufficient. In such a case, the first determining module 520 may be configured to determine the use state of the first resource at least based on a quantity of D2D devices corresponding to a signal received on the at least one first RU.

In another possible implementing manner, the use state of the first resource is determined at least based on energy of a signal received on the at least one first RU. Specifically, for example, in the RG shown in FIG. 2(b), if energy of a signal detected on the first RU in the upper right corner exceeds a preset energy threshold, it represents that the use state of the first resource is insufficient; if the energy of the signal detected on the first RU in the upper right corner exceeds the threshold, it represents that the use state of the first resource is redundant; and if the energy of the signal received on the first RU does not exceed the threshold, it represents that the use state of the first resource is normal. In such a case, the first determining module 520 may be configured to determine the use state of the first resource at least based on energy of a signal received on the at least one first RU.

In still another possible implementing manner, only one or more specific D2D devices may detect and report (for example, broadcast) the use state of the first resource by using the first RU, so that the use state of the first resource is used by another D2D device as a reference for using/adjusting the first resource. In the method in this embodiment, the use state may be determined by using a manner of monitoring and acquiring a use state reported by such one or more D2D devices. In such a case, the first determining module 520 may be configured to: in response to that a signal received on the at least one first RU is from at least one preset D2D device, determine the use state of the first resource at least based on the received signal. In such a case, the determining the use state of the first resource according to the received signal comprises determining the use state of the first resource based on a position of a first RU corresponding to a received signal and/or energy of a received signal as described above.

In still another possible implementing manner, for the apparatus in this embodiment, the first resource comprises at least two RGs, and at least one RG of the at least two RGs is used to send a D2DSS when necessary. Such an RG is referred to as a first RG hereinafter, and an RU at a second preset position on the first RG may also be the first RU. Generally, a D2DSS is sent by a base station, and in the partial or complete absence of the coverage of a base station, a D2DSS may be sent by a specific D2D device (for example, a cluster head device). In the apparatus in this embodiment, after a cluster head terminates sending of a D2DSS, another D2D device may continue to send a D2DSS. In such an implementing manner, except that a D2DSS and/or information used to indicate the use state of the first resource is sent when necessary, the first RG is used as a backup RG, and nearly does not carry any another information. When a D2D device cannot find, on a conventional RG, a resource used to send a discovery signal or D2D data, the resource may be sent by using an RU on the first RG. That is, when a signal is detected on the first RG, it may mean that the use state of the first resource is that the resource is insufficient. In such a case, the first determining module 520 may be configured to determine the use state of the first resource at least based on a signal received on at least one RU in the RG used to send a D2DSS.

FIG. 2(c) is a schematic diagram of a first RG in an example. In the example in FIG. 2(c), the first resource is a discovery resource, and FIG. 2(c) shows a first resource of a DP. The first resource comprises several continuous or intermittent RGs, and in each DP, each D2D device selects one RU to send a discovery signal, and such an act can occur only once. That is, each D2D device can perform only once an act of sending a discovery signal in one DP, and is monitoring a discovery signal sent by another device during the rest time. For discontinuous RGs, resources between two RGs may be used for D2D communication or communication of a cellular network (for example, LTE-A) system. In FIG. 2(c), one last RG in the DP is a first RG, and nearly does not carry a signal or is not used to send a D2DSS on an RU having a slash fill in FIG. 2(c).

In still another possible implementing manner, the apparatus in this embodiment may determine the use state of the first resource by using a manner of actively searching for a usable resource. Generally, the search may start from the first RU of the first RG, until one last RU of one last RG is detected. In the apparatus in this embodiment, one D2D device is allowed to detect multiple usable RUs, and one or more usable RUs are randomly selected. In such a case, the first determining module 520 may be configured to determine the use state of the first resource in response to that a second preset quantity of continuous RUs have the same occupying state. For example, when a second preset quantity of continuous RUs are not occupied, it may be determined that the use state of the first resource is that the resource is redundant.

Alternatively, the first determining module 520 may be configured to determine the use state of the first resource in response to that a third preset quantity of RUs have the same occupying state. For example, when it is detected that a third preset quantity of RUs are not occupied, it may be determined that the use state of the first resource is that the resource is redundant.

The second preset quantity and the third preset quantity may be arbitrarily set according to factors such as a deployment density of D2D devices and a size of a first resource. For example, a quantity of RUs comprised in one RG is the first preset quantity.

As discussed above, the apparatus in this embodiment may send first information correlated to the use state by using only at least one first RU in the first RG, that is, the first sending module 540 may be further configured to send the first information correlated to the use state by using the at least one first RU in the first RG.

Figure 5B:
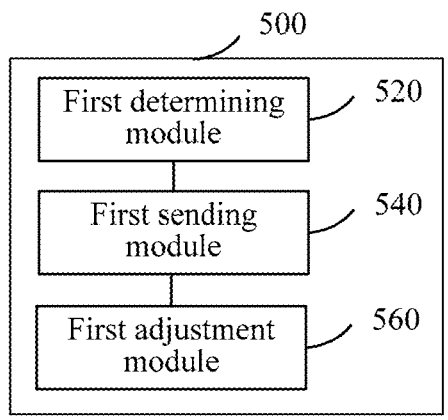

In addition, as discussed above, the apparatus in this embodiment is particularly applicable to a D2D communication scenario of completely no coverage of a base station, in the absence of the assistance from a base station, and the apparatus in this embodiment may dynamically adjust the first resource based on the use state of the first resource. In such a case, as shown in FIG. 5(b), the apparatus in this embodiment 500 further comprises:

a first adjustment module 560, configured to adjust the first resource at least based on the use state of the first resource.

Specifically, after the apparatus in this embodiment cannot receive a D2DSS from a base station or a D2DSS from another device, the apparatus sends a D2DSS, and implements dynamic adjustment of the first resource based on the use state of the first resource. In such a case, the first adjustment module 560 may be configured to: in response to that a D2DSS cannot be received, adjust the first resource at least based on the use state of the first resource.

As discussed above, in a possible implementing manner, an RG may be used as a unit to adjust the first resource. For example, when the use state shows that the first resource is insufficient, one RG is added to the first resource; and when the use state shows that the first resource is redundant, one RG is reduced from the first resource.

The discovery resource shown in FIG. 2(c) is used as an example. According to the apparatus in this embodiment, when the first resource is insufficient, one RG may be added, and the first RG is still one last RG in one DP, as shown in FIG. 2(d). When the first resource is redundant, one RG may be deleted, and the first RG is still one last RG in one DP, as shown in FIG. 2(e). Therefore, the first resource is adjusted, and the DP is adjusted.

In a possible implementing manner, the first RG discussed above may be used to send a D2DSS.

In response to that a D2DSS cannot be received, an RU in the first RG is used to send a D2DSS.

In the apparatus in this embodiment, after the first resource is adjusted, the first RG may be used to send second information correlated to the adjusted first resource, to notify another D2D device of the changed first resource. Specifically, the first sending module 540 may be further configured to send second information correlated to the adjusted first unit by using at least one RU in the first RG.

Figure 5C:
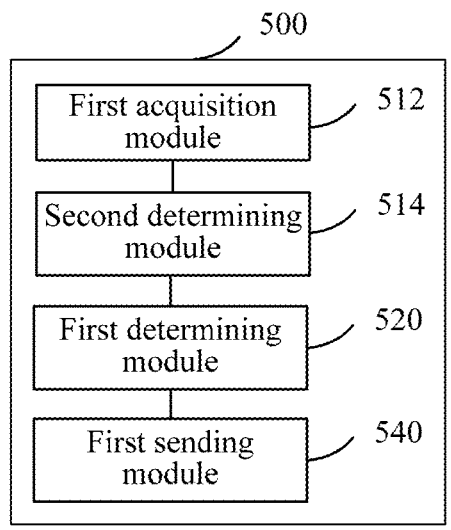

In the apparatus in this embodiment, the first resource is initially assigned by a base station, information related to the assignment may be acquired by using a manner of directly communicating with a base station or indirectly communicating with a base station by using another D2D device. In such a case, as shown in FIG. 5(c), the apparatus in this embodiment 500 further comprises:

a first acquisition module 512, configured to acquire resource configuration information; and a second determining module 514, configured to determine the first resource at least based on the resource configuration information.

It should be noted that, the apparatus in this embodiment is applicable to a scenario of completely no coverage of a cellular network, but is still applicable to scenarios of partial coverage of a cellular network and complete coverage of a cellular network. In such cases, the first RG may be not used to send a D2DSS, and is used as only a backup RG.

In conclusion, the apparatus in this embodiment is applicable to scenarios of no coverage of a base station, partial coverage of a base station, and full coverage of a base station, regardless of dense deployment of devices, medium-density deployment or sparse deployment. Even, without the help of a base station, a D2D device can also find a usable resource to implement functions of device discovery and/or D2D communication. For a scenario of dense deployment, the apparatus in this embodiment can still work desirably without causing severe interference and resource conflict. For sparse deployment, the apparatus in this embodiment can increase spectral efficiency and discovery efficiency. It should be particularly noted that, the apparatus in this embodiment can use the same method and physical channel to adapt to the two scenarios of deployment, and additional system complexity is not increased for different scenarios.

Figure 6A:
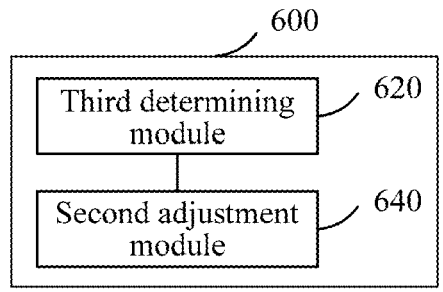
FIG. 6(a) to FIG. 6(c) are structural block diagrams of multiple examples of a D2D communication apparatus according to a second embodiment of the present application.

FIG. 6(a) is a flowchart of an example of a D2D communication apparatus according to a second embodiment of the present application. The apparatus may belong to a D2D device or be a D2D device. As shown in FIG. 6(a), the apparatus 600 comprises:

a third determining module 620, configured to determine a use state of a first resource, where the first resource is used to perform D2D communication; and a second adjustment module 640, configured to adjust the first resource at least based on the use state of the first resource.

As described with reference to FIG. 2(a), the apparatus in this embodiment is particularly applicable to a D2D communication scenario of completely no coverage of a base station, in the absence of the assistance from a base station, and the apparatus in this embodiment may dynamically adjust the first resource based on the use state of the first resource.

A first RU is an RU at one or more first preset positions in the first resource. The first preset position may be any fixed position in the first resource. In a possible implementing manner, the first preset position may be a second preset position in an RG of one or more positions. FIG. 2(b) shows an RG in an example, where each box represents one RU, the RG comprises $N_T \times N_F$ RUs, and the first RU may be a first RU in an RG (in time domain), as shown by a diagonal fill in the upper left corner in FIG. 2(b), or may be one last RU (in time domain), as shown by a diagonal fill in the upper right corner in FIG. 2(b). The first preset position may further be a position relative to a special signal in D2D communication. In a possible implementing manner, the special signal may be a D2DSS, and the first preset position is a position that has a particular offset relative to a D2DSS. In the apparatus in this embodiment, a position of the first RU is known to D2D devices, a D2D device may acquire, by using a manner of performing monitoring on a resource at the position, the use state of the first resource reported by another D2D device, and/or after the use state of the first resource is actively detected by using another possible manner, information used to indicate the use state of the first resource is transmitted by using the first RU.

In addition, in the apparatus in this embodiment, the use state of the first resource comprises but not limited to: the resource is redundant, the resource is insufficient, and the like. In a possible implementing manner, the use state of the first RU may be transmitted by using a manner of transmitting, on the first RU, information modulated with a use state. In another possible implementing manner, first RUs at different positions may be used to indicate different use states. For example, in each RG shown in FIG. 2(b), information transmitted on a first RU in an upper left corner may indicate that the first resource is surplus, and information transmitted on a first RU in an upper right corner may indicate that the first resource is insufficient.

In the apparatus in this embodiment, transmission of a resource at a specific position is used to indicate a use state of a D2D resource, and it can be particularly implemented that the basis for resource adjustment is provided in a case of no coverage of a cellular network.

As discussed above, the apparatus in this embodiment may make first RUs at different positions correspond to different use states, and to determine a use state of a first resource more accurately, the apparatus for executing the method in this embodiment may determine a use state of a first resource only when a sufficiently large quantity of signals are detected on a corresponding first RU. In other words, only a use state reported by a sufficiently large quantity of D2D devices is regarded as an actual use state. For example, signals from D2D devices whose quantity exceeds a specific quantity are detected on the first RU in the upper right corner in the RG shown in FIG. 2(b), and it may be determined that a use state of a first resource is that the resource is insufficient. In such a case, the third determining module 620 may be configured to determine the use state of the first resource at least based on a quantity of D2D devices corresponding to a signal received on the at least one first RU.

In another possible implementing manner, the use state of the first resource is further determined at least based on energy of a signal received on the at least one first RU. Specifically, for example, in the RG shown in FIG. 2(b), if energy of a signal detected on the first RU in the upper right corner exceeds a preset energy threshold, it represents that the use state of the first resource is insufficient; if the energy of the signal detected on the first RU in the upper right corner exceeds the threshold, it represents that the use state of the first resource is redundant; and if the energy of the signal received on the first RU does not exceed the threshold, it represents that the use state of the first resource is normal. In such a case, the third determining module 620 may be configured to determine the use state of the first resource at least based on energy of a signal received on the at least one first RU.

In still another possible implementing manner, only one or more specific D2D devices may detect and report (for example, broadcast) the use state of the first resource by using the first RU, so that the use state of the first resource is used by another D2D device as a reference for using/adjusting the first resource. The apparatus in this embodiment may determine the use state by using a manner of monitoring and acquiring a use state reported by such one or more D2D devices. In such a case, the third determining module 620 may be configured to: in response to that a signal received on the at least one first RU is from at least one preset D2D device, determine the use state of the first resource at least based on the received signal. In such a case, the determining the use state of the first resource according to the received signal comprises determining the use state of the first resource based on a position of a first RU corresponding to a received signal and/or energy of a received signal as described above.

In still another possible implementing manner, for the apparatus in this embodiment, the first resource comprises at least two RGs, and at least one RG of the at least two RGs is used to send a D2DSS when necessary. Such an RG is referred to as a first RG hereinafter, and an RU at a second preset position on the first RG may also be the first RU. Generally, a D2DSS is sent by a base station, and in the partial or complete absence of the coverage of a base station, a D2DSS may be sent by a specific D2D device (for example, a cluster head device). In the method in this embodiment, after a cluster head terminates sending of a D2DSS, another D2D device may continue to send a D2DSS. In such an implementing manner, except that a D2DSS and/or information used to indicate the use state of the first resource is sent when necessary, the first RG is used as a backup RG, and nearly does not carry any another information. When a D2D device cannot find, on a conventional RG, a resource used to send a discovery signal or D2D data, the resource may be sent by using an RU on the first RG. That is, when a signal is detected on the first RG, it may mean that the use state of the first resource is that the resource is insufficient. In such a case, the third determining module 620 may be configured to determine the use state of the first resource at least based on a signal received on at least one RU in the RG used to send a D2DSS.

FIG. 2(*c*) is a schematic diagram of a first RG in an example. In the example in FIG. 2(*c*), the first resource is a discovery resource, and FIG. 2(*c*) shows a first resource of a DP. The first resource comprises several continuous or intermittent RGs, and in each DP, each D2D device selects one RU to send a discovery signal, and such an act can occur only once. That is, each D2D device can perform only once an act of sending a discovery signal in one DP, and is monitoring a discovery signal sent by another device during the rest time. For discontinuous RGs, resources between two RGs may be used for D2D communication or communication of a cellular network (for example, LTE-A) system. In FIG. 2(*c*), one last RG in the DP is a first RG, and nearly does not carry a signal or is not used to send a D2DSS on an RU having a slash fill in FIG. 2(*c*).

In still another possible implementing manner, the apparatus in this embodiment may determine the use state of the first resource by using a manner of actively searching for a usable resource. Generally, the search may start from the first RU of the first RG, until one last RU of one last RG is detected. In the apparatus in this embodiment, one D2D device is allowed to detect multiple usable RUs, and one or more usable RUs are randomly selected. In such a case, the third determining module 620 may be configured to determine the use state of the first resource in response to that a second preset quantity of continuous RUs have the same occupying state. For example, when a second preset quantity of continuous RUs are not occupied, it may be determined that the use state of the first resource is that the resource is redundant.

Alternatively, the third determining module 620 may be configured to determine the use state of the first resource in response to that a third preset quantity of RUs have the same occupying state. For example, when it is detected that a third preset quantity of RUs are not occupied, it may be determined that the use state of the first resource is that the resource is redundant.

The second preset quantity and the third preset quantity may be arbitrarily set according to factors such as a deployment density of D2D devices and a size of a first resource. For example, a quantity of RUs comprised in one RG is the first preset quantity.

Figure 6B:
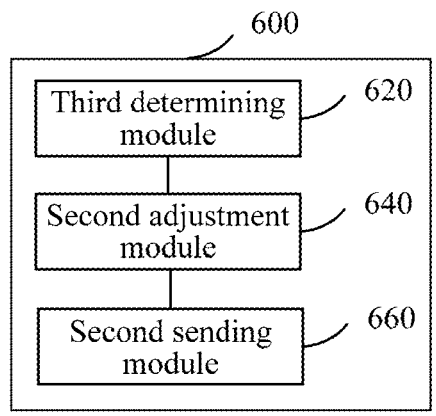
Figure 6C:
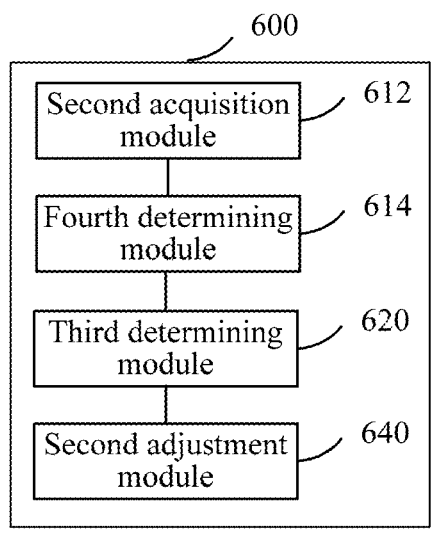

As discussed above, after determining the use state of the first resource, the apparatus in this embodiment may further report (for example, broadcast) the use state of the first resource by using the first RU, so that the use state of the first resource is used by another D2D device as a reference for using/adjusting the first resource. In such a case, as shown in FIG. 6(*b*), the apparatus in this embodiment 600 further comprises:

a second sending module 660, configured to send the first information correlated to the use state by using the at least one first RU in the first resource.

As discussed above, the apparatus in this embodiment may send first information correlated to the use state by using only at least one first RU in the first RG, that is, the second sending module 660 may be configured to send the first information correlated to the use state by using the at least one first RU in the first RG.

In addition, after the apparatus in this embodiment cannot receive a D2DSS from a base station or a D2DSS from another device, the apparatus sends a D2DSS, and implements dynamic adjustment of the first resource based on the use state of the first resource. In such a case, the second adjustment module 640 may be configured to: in response to that a D2DSS cannot be received, adjust the first resource at least based on the use state of the first resource.

As discussed above, in a possible implementing manner, an RG may be used as a unit to adjust the first resource. For example, when the use state shows that the first resource is insufficient, one RG is added to the first resource; and when the use state shows that the first resource is redundant, one RG is reduced from the first resource.

The discovery resource shown in FIG. 2(*c*) is used as an example. By means of the apparatus in this embodiment, when the first resource is insufficient, one RG may be added, and the first RG is still one last RG in one DP, as shown in FIG. 2(*d*). When the first resource is redundant, one RG may be deleted, and the first RG is still one last RG in one DP, as shown in FIG. 2(*e*). Therefore, the first resource is adjusted, and the DP is adjusted.

In a possible implementing manner, the first RG discussed above may be used to send a D2DSS.

In response to that a D2DSS cannot be received, an RU in one last RG of the first resource is used to send a D2DSS.

In the apparatus in this embodiment, after the first resource is adjusted, the first RG may be used to send second information correlated to the adjusted first resource, to notify another D2D device of the changed first resource. Specifically, the second sending module 660 may be configured to send second information correlated to the adjusted first unit by using at least one RU in the first RG.

In the apparatus in this embodiment, the first resource is initially assigned by a base station, information related to the assignment may be acquired by using a manner of directly communicating with a base station or indirectly communicating with a base station by using another D2D device. In such a case, as shown in FIG. 6(*c*), the apparatus in this embodiment 600 further comprises:

a second acquisition module 612, configured to acquire resource configuration information; and a fourth determining module 614, configured to determine the first resource at least based on the resource configuration information.

It should be noted that, the apparatus in this embodiment is applicable to a scenario of completely no coverage of a cellular network, but is still applicable to scenarios of partial coverage of a cellular network and complete coverage of a cellular network. In such cases, the first RG may be not used to send a D2DSS, and is used as only a backup RG.

In conclusion, the apparatus in this embodiment is applicable to scenarios of no coverage of a base station, partial coverage of a base station, and full coverage of a base station, regardless of dense deployment of devices, medium-density deployment or sparse deployment. Even, without the help of a base station, a D2D device can also find a usable resource to implement functions of device discovery and/or D2D communication. For a scenario of dense deployment, the apparatus in this embodiment can still work desirably without causing severe interference and resource conflict. For sparse deployment, the apparatus in this embodiment can increase spectral efficiency and discovery efficiency. It should be particularly noted that, the apparatus in this embodiment can use the same method and physical channel to adapt to the two scenarios of deployment, and additional system complexity is not increased for different scenarios.

Figure 7:
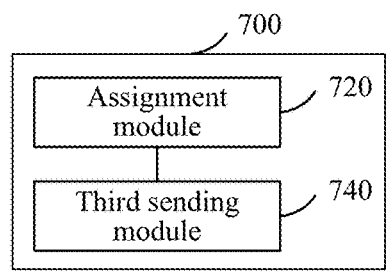
FIG. 7 is a structural block diagram of an example of an apparatus for assigning a D2D communication resource according to an embodiment of the present application.

As shown in FIG. 7, an embodiment of the present application further provides an apparatus for assigning a D2D communication resource. The apparatus may belong to a base station. As shown in FIG. 7, the apparatus 700 comprises:

an assignment module 720, configured to assign a first resource used to perform D2D communication; and a third sending module 740, configured to send resource configuration information correlated to the assignment.

The involved first resource and the like may all be as described with reference to FIG. 5(a) to FIG. 5(c) and FIG. 6(a) to FIG. 6(c).

Figure 8:
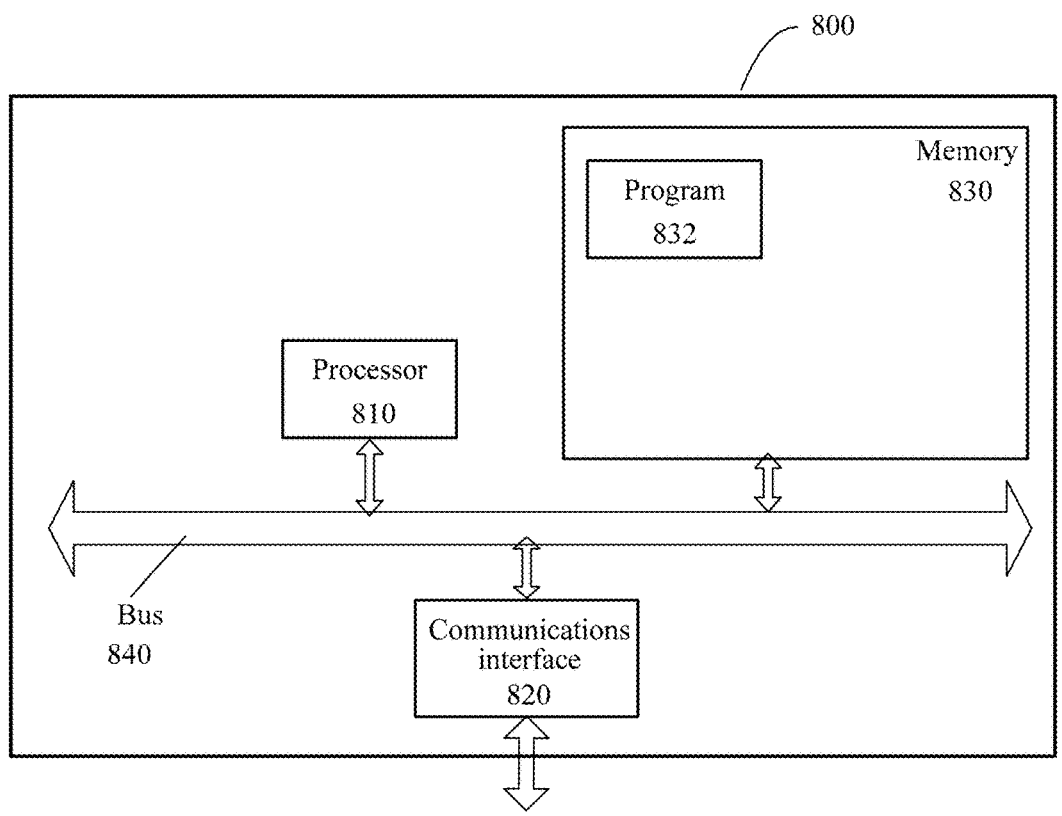
FIG. 8 is a structural block diagram of another example of a D2D communication apparatus according to a first embodiment of the present application.

FIG. 8 is a schematic structural diagram of a D2D communication apparatus according to a first embodiment of the present application, and the specific embodiments of the present application do not limit the specific implementation of the D2D communication apparatus. As shown in FIG. 8, the D2D communication apparatus 800 may comprise:

a processor 810, a communications interface 820, a memory 830, and a communication bus 840. In this case:

the processor 810, the communications interface 820, and the memory 830 accomplish mutual communications via the communication bus 840.

The communications interface 820 is configured to communicate with a network element such a client.

The processor 810 is configured to execute a program 832, and specifically, may execute relevant steps in the embodiment of the method shown in FIG. 2(a) above.

Specifically, the program 832 may comprise a program code, the program code comprising a computer operation instruction.

The processor 810 may be a central processing unit CPU, or an application specific integrated circuit ASIC, or be configured to be one or more integrated circuits which implement the embodiments of the present application.

The memory 830 is configured to store the program 832. The memory 830 may comprise a high-speed RAM memory, or may also comprise a non-volatile memory, for example, at least one magnetic disk memory. The program 832 may specifically be used to cause the D2D communication apparatus 800 to perform the following steps:

determining a use state of a first resource, where the first resource is used to perform D2D communication; and sending first information correlated to the use state by using at least one first RU in the first resource, wherein the at least one first RU is an RU at at least one first preset position in the first resource.

Reference may be made to the corresponding description of corresponding steps or units in the foregoing embodiments for the specific implementation of the steps in the program 832, and will not be described here. It may be clearly known by those skilled in the art that reference may be made to the description of corresponding procedures in the foregoing embodiments of the method for the specific working procedures of the devices and modules described above, and will not be described here in order to make the description convenient and concise.

Figure 9:
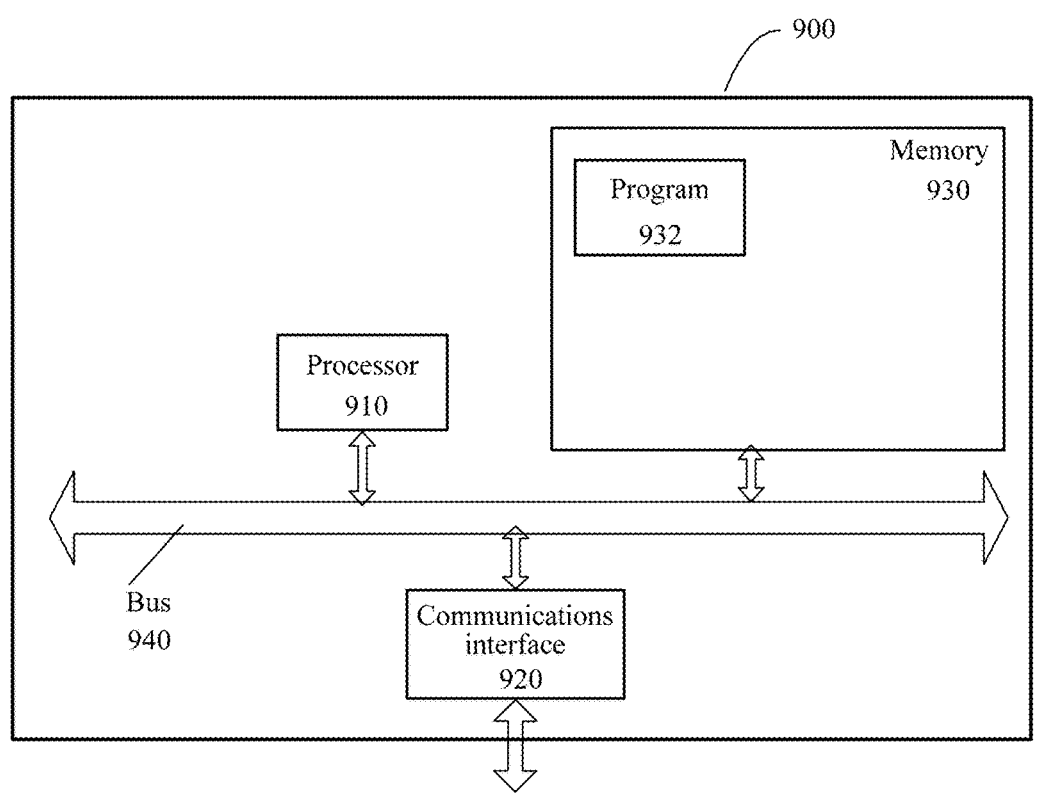
FIG. 9 is a structural block diagram of another example of a D2D communication apparatus according to a second embodiment of the present application.

FIG. 9 is a schematic structural diagram of a D2D communication apparatus according to a second embodiment of the present application, and the specific embodiments of the present application do not limit the specific implementation of the D2D communication apparatus. As shown in FIG. 9, the D2D communication apparatus 900 may comprise:

a processor 910, a communications interface 920, a memory 930, and a communication bus 940. In this case:

the processor 910, the communications interface 920, and the memory 930 accomplish mutual communications via the communication bus 940.

The communications interface 920 is configured to communicate with a network element such a client.

The processor 910 is configured to execute a program 932, and specifically, may execute relevant steps in the embodiment of the method shown in FIG. 3 above.

Specifically, the program 932 may comprise a program code, the program code comprising a computer operation instruction.

The processor 910 may be a central processing unit CPU, or an application specific integrated circuit ASIC, or be configured to be one or more integrated circuits which implement the embodiments of the present application.

The memory 930 is configured to store the program 932. The memory 930 may comprise a high-speed RAM memory, or may also comprise a non-volatile memory, for example, at least one magnetic disk memory. The program 932 may specifically be used to cause the D2D communication apparatus 900 to perform the following steps:

determining a use state of a first resource, where the first resource is used to perform D2D communication; and adjusting the first resource at least based on the use state of the first resource, wherein a first RU is an RU at at least one first preset position in the first resource.

Reference may be made to the corresponding description of corresponding steps or units in the foregoing embodiments for the specific implementation of the steps in the program 932, and will not be described here. It may be clearly known by those skilled in the art that reference may be made to the description of corresponding procedures in the foregoing embodiments of the method for the specific working procedures of the devices and modules described above, and will not be described here in order to make the description convenient and concise.

Figure 10:
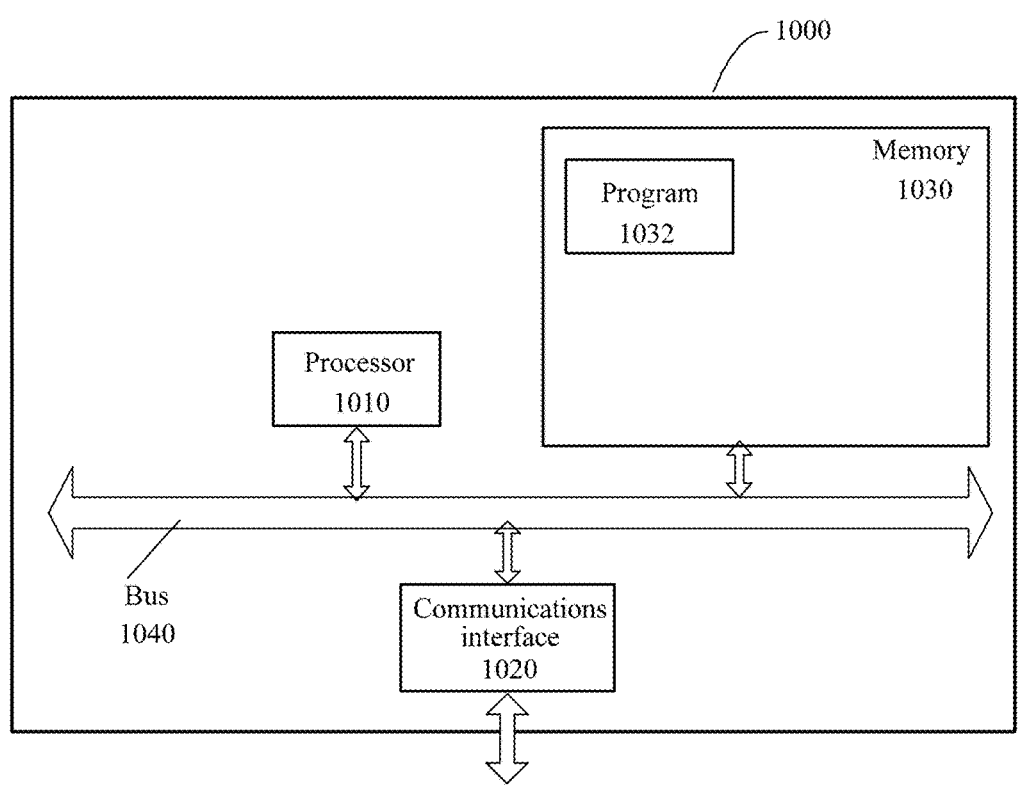
FIG. 10 is a structural block diagram of another example of an apparatus for assigning a D2D communication resource according to an embodiment of the present application.

FIG. 10 is a schematic structural diagram of still another example of the apparatus for assigning a D2D communication resource according to an embodiment of the present application, and the specific embodiments of the present application do not limit the specific implementation of the resource assignment apparatus. As shown in FIG. 10, the apparatus 1000 for assigning a D2D communication resource may comprise:

a processor 1010, a communications interface 1020, a memory 1030, and a communication bus 1040. In this case:

the processor 1010, the communications interface 1020, and the memory 1030 accomplish mutual communications via the communication bus 1040.

The communications interface 1020 is configured to communicate with a network element such a client.

The processor 1010 is configured to execute a program 1032, and specifically, may execute relevant steps in the embodiment of the method shown in FIG. 4 above.

Specifically, the program 1032 may comprise a program code, the program code comprising a computer operation instruction.

The processor 1010 may be a central processing unit CPU, or an application specific integrated circuit ASIC, or be configured to be one or more integrated circuits which implement the embodiments of the present application.

The memory 1030 is configured to store the program 1032. The memory 1030 may comprise a high-speed RAM memory, or may also comprise a non-volatile memory, for example, at least one magnetic disk memory. The program 1032 may specifically be used to cause the apparatus 1000 for assigning a D2D communication resource to perform the following steps:

assigning a first resource used to perform D2D communication; and sending resource configuration information correlated to the assignment, wherein the first resource comprises at least one first RU, and the at least one first RU is an RU at at least one first preset position in the first resource, and is used to transmit first information correlated to a use state of the first resource.

Reference may be made to the corresponding description of corresponding steps or units in the foregoing embodiments for the specific implementation of the steps in the program 1032, and will not be described here. It may be clearly known by those skilled in the art that reference may be made to the description of corresponding procedures in the foregoing embodiments of the method for the specific working procedures of the devices and modules described above, and will not be described here in order to make the description convenient and concise.

It may be clearly known by those skilled in the art that reference may be made to the corresponding description in the foregoing embodiments of the apparatus for the specific working procedures of the devices and modules described above, and will not be described here in order to make the description convenient and concise.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures and other types of structures that perform particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments wherein tasks are performed by remote processing devices linked through a communications network. In a distributed computing environment, program modules may be located in both local and remote memory storage devices.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The above implementations are only used to describe the present invention, without limiting the present invention; various alterations and variants can be made by those skilled in the art without departing from the spirit and scope of the present invention, so all equivalent technical solutions also belong to the scope of the present invention, and the scope of patent protection of the present invention should be defined by claims.

What is claimed is:

1. A device-to-device (D2D) communication method, comprising:
   determining a use state of a first resource, wherein the first resource is used to perform D2D communication;
   sending first information correlated to the use state of the first resource by using at least one first resource unit (RU) in the first resource,
   wherein the at least one first RU is an RU at at least one first preset position in the first resource, and wherein different use states of the first resource are indicated by using the at least one first RU at different positions; and
   transmitting, on the at least one first RU, information modulated with a use state of the at least one first RU;
   wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and
   the determining a use state of a first resource comprises:
   determining the use state of the first resource at least based on a signal received on at least one RU in the first RG, wherein the use state of the first resource is that the first resource is insufficient when a signal is detected on the first RG.

2. The method of claim 1, wherein the determining a use state of a first resource comprises:
   determining the use state of the first resource at least based on a quantity of D2D devices corresponding to a signal received on the at least one first RU.

3. The method of claim 1, wherein the determining a use state of a first resource comprises:

determining the use state of the first resource at least based on energy of a signal received on the at least one first RU.

4. The method of claim 2, wherein the determining a use state of a first resource comprises:
in response to determining that the signal received on the at least one first RU is from at least one preset D2D device, determining the use state of the first resource at least based on the signal received on the at least one first RU.

5. The method of claim 1, wherein the determining a use state of a first resource comprises:
determining, in response to determining that a third preset quantity of RUs have a same occupying state, the use state of the first resource.

6. The method of claim 1, further comprising: adjusting the first resource at least based on the use state of the first resource.

7. The method of claim 1, further comprising: acquiring resource configuration information; and
determining the first resource at least based on the resource configuration information.

8. A device-to-device (D2D) communication method, comprising:
determining a use state of a first resource, wherein the first resource is used to perform D2D communication;
adjusting the first resource at least based on the use state of the first resource,
wherein the first resource comprises at least one first resource unit (RU), and the at least one first RU is an RU at at least one first preset position in the first resource, and wherein different use states of the first resource are indicated by using the at least one first RU at different positions; and
transmitting, on the at least one first RU, information modulated with a use state of the at least one first RU;
wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and
the determining a use state of a first resource comprises:
determining the use state of the first resource at least based on a signal received on at least one RU in the first RG, wherein the use state of the first resource is that the first resource is insufficient when a signal is detected on the first RG.

9. The method of claim 8, further comprising: sending first information correlated to the use state of the first resource by using the at least one first RU in the first resource.

10. The method of claim 8, wherein the adjusting the first resource comprises:
in response to that a D2D synchronization signal (D2DSS) is not received, adjusting the first resource at least based on the use state of the first resource.

11. The method of claim 8, wherein
the adjusting the first resource comprises:
in response to that a D2DSS is not received, sending a D2DSS using at least one RU in the at least one RG used to send a D2DSS.

12. The method of claim 8, further comprising: acquiring resource configuration information; and
determining the first resource at least based on the resource configuration information.

13. A device-to-device (D2D) communication resource assignment method, comprising:
assigning a first resource used to perform D2D communication;
sending resource configuration information correlated to the assignment of the first resource,
wherein the first resource comprises at least one first resource unit (RU), and the at least one first RU is an RU at at least one first preset position in the first resource, and is used to transmit first information correlated to a use state of the first resource, and wherein different use states of the first resource are indicated by using the at least one first RU at different positions; and
transmitting, on the at least one first RU, information modulated with a use state of the at least one first RU;
wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and
determining the use state of the first resource at least based on a signal received on at least one RU in the first RG, wherein the use state of the first resource is that the first resource is insufficient when a signal is detected on the first RG.

14. A device-to-device (D2D) communication apparatus, comprising:
a determining module, configured to determine a use state of a first resource, wherein the first resource is used to perform D2D communication;
a sending module, configured to send first information correlated to the use state of the first resource by using at least one first RU in the first resource,
wherein the at least one first RU is an RU at at least one first preset position in the first resource, and wherein different use states of the first resource are indicated by using the at least one first RU at different positions; and
transmitting, on the at least one first RU, information modulated with a use state of the at least one first RU;
wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and
wherein the operations further comprise determining the use state of the first resource at least based on a signal received on at least one RU in the first RG, and the use state of the first resource is that the first resource is insufficient when a signal is detected on the first RG.

15. A device-to-device (D2D) communication apparatus, comprising:
a determining module, configured to determine a use state of a first resource, wherein the first resource is used to perform D2D communication;
an adjustment module, configured to adjust the first resource at least based on the use state of the first resource,
wherein the first resource comprises at least one first resource unit (RU), and the at least one first RU is an RU at at least one first preset position in the first resource, and wherein different use states of the first resource are indicated by using the at least one first RU at different positions; and transmitting, on the at least one first RU, information modulated with a use state of the at least one first RU;

wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and the determining module is further configured to determine the use state of the first resource at least based on a signal received on at least one RU in the first RG, wherein the use state of the first resource is that the first resource is insufficient when a signal is detected on the first RG.

16. A device-to-device (D2D) communication resource assignment apparatus, comprising:

an assignment module, configured to assign a first resource used to perform D2D communication;

a sending module, configured to send resource configuration information correlated to an assignment of the first resource, wherein the first resource comprises at least one first resource unit (RU), and the at least one first RU is an RU at at least one first preset position in the first resource, and is used to transmit first information correlated to a use state of the first resource, and wherein different use states of the first resource are indicated by using the at least one first RU at different positions; and transmitting, on the at least one first RU, information modulated with a use state of the at least one first RU;

wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and determining the use state of the first resource at least based on a signal received on at least one RU in the first RG, wherein the use state of the first resource is that the first resource is insufficient when a signal is detected on the first RG.

17. A device-to-device (D2D) communication apparatus, comprising:

a transceiver;

a memory, configured to store an instruction; and a processor, configured to execute the instruction stored in the memory, wherein the instruction causes the processor to execute operations including:

determining a use state of a first resource, wherein the first resource is used to perform D2D communication;

sending, by using the transceiver, first information correlated to the use state of the first resource by using at least one first resource unit (RU) in the first resource, wherein the at least one first RU is an RU at at least one first preset position in the first resource, and wherein different use states of the first resource are indicated by using the at least one first RU at different positions; and transmitting, on the at least one first RU, information modulated with a use state of the at least one first RU;

wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and the determining a use state of a first resource comprises:

determining the use state of the first resource at least based on a signal received on at least one RU in the first RG, wherein the use state of the first resource is that the first resource is insufficient when a signal is detected on the first RG.

18. The apparatus of claim 17, wherein the operations further comprise determining the use state of the first resource at least based on a quantity of D2D devices corresponding to the signal received on the at least one first RU.

19. The apparatus of claim 17, wherein the operations further comprise determining the use state of the first resource at least based on energy of a signal received on the at least one first RU.

20. The apparatus of claim 18, wherein the operations further comprise:

in response to determining that the signal received on the at least one first RU is from at least one preset D2D device, determining the use state of the first resource at least based on the received signal.

21. The apparatus of claim 17, wherein the operations further comprise, in response to determining that a third preset quantity of RUs have a same occupying state, determining the use state of the first resource.

22. The apparatus of claim 17, wherein the operations further comprise: adjusting the first resource at least based on the use state of the first resource.

23. The apparatus of claim 17, wherein the operations further comprise: acquiring resource configuration information; and determining the first resource at least based on the resource configuration information.

24. A device-to-device (D2D) communication apparatus, comprising:

a transceiver;

a memory, configured to store an instruction; and a processor, configured to execute the instruction stored in the memory, wherein the instruction causes the processor to execute operations including:

determining a use state of a first resource, wherein the first resource is used to perform D2D communication;

adjusting the first resource at least based on the use state of the first resource, wherein the first resource comprises at least one first resource unit (RU), and the at least one first RU is an RU at at least one first preset position in the first resource, and wherein different use states of the first resource are indicated by using the at least one first RU at different positions; and transmitting, on the at least one first RU, information modulated with a use state of the at least one first RU;

wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and the determining a use state of a first resource comprises:

determining the use state of the first resource at least based on a signal received on at least one RU in the first RG, wherein the use state of the first resource is that the first resource is insufficient when a signal is detected on the first RG.

25. The apparatus of claim 24, wherein the operations further comprise: sending first information correlated to the use state of the first resource by using the at least one first RU in the first resource.

26. The apparatus of claim 24, wherein the operations further comprise, in response to that a D2D synchronization signal (D2DSS) is not received, adjusting the first resource at least based on the use state of the first resource.

27. The apparatus of claim 24, wherein the operations further comprise: acquiring resource configuration information; and determining the first resource at least based on the resource configuration information.

28. A device-to-device (D2D) communication resource assignment apparatus, comprising:

a transceiver;

a memory, configured to store an instruction; and a processor, configured to execute the instruction stored in the memory, wherein the instruction causes the processor to execute operations including:

assigning a first resource used to perform D2D communication;

sending, by using the transceiver, resource configuration information correlated to the assignment of the first resource, wherein the first resource comprises at least one first resource unit (RU), and the at least one first RU is an RU at at least one first preset position in the first resource, and is used to transmit first information correlated to a use state of the first resource, and wherein different use states of the first resource are indicated by using the at least one first RU at different positions; and transmitting, on the at least one first RU, information modulated with a use state of the at least one first RU;

wherein the first resource comprises at least two resource groups (RGs), a first RG of the at least two RGs comprises a first preset quantity of continuous RUs, the at least one first RU is an RU at at least one second preset position in the first RG, and the first RG is used to send a D2D synchronization signal (D2DSS); and wherein the operations further comprising determining the use state of the first resource at least based on a signal received on at least one RU in the first RG, and the use state of the first resource is that the first resource is insufficient when a signal is detected on the first RG.

* * * * *